(12) United States Patent
Fert (10) Patent No.: US 10,378,481 B2
(45) Date of Patent: Aug. 13, 2019

(54) DEPLOYABLE GRILLE WITH FINS FOR AIRCRAFT TURBINE ENGINE THRUST-REVERSAL SYSTEM

(71) Applicant: SAFRAN AIRCRAFT ENGINES, Paris (FR)

(72) Inventor: Jeremy Edmond Fert, Paris (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 300 days.

(21) Appl. No.: 15/516,938

(22) PCT Filed: Oct. 12, 2015

(86) PCT No.: PCT/FR2015/052732
§ 371 (c)(1),
(2) Date: Apr. 5, 2017

(87) PCT Pub. No.: WO2016/059331
PCT Pub. Date: Apr. 21, 2016

(65) Prior Publication Data
US 2017/0370325 A1    Dec. 28, 2017

(30) Foreign Application Priority Data

Oct. 13, 2014    (FR) .................................... 14 59801

(51) Int. Cl.
| | |
|---|---|
| *F02K 1/72* | (2006.01) |
| *F02K 1/70* | (2006.01) |
| *F02K 1/62* | (2006.01) |
| *F02K 1/76* | (2006.01) |
| *F02K 3/06* | (2006.01) |

(52) U.S. Cl.
CPC .................. *F02K 1/72* (2013.01); *F02K 1/70* (2013.01); *F02K 1/763* (2013.01); *F02K 3/06* (2013.01); *F05D 2220/323* (2013.01); *F05D 2240/12* (2013.01); *F05D 2260/52* (2013.01); *F05D 2260/57* (2013.01); *Y02T 50/671* (2013.01)

(58) Field of Classification Search
CPC ... F02K 1/72; F02K 1/625; F02K 1/62; F02K 1/70
See application file for complete search history.

(56) References Cited

U.S. PATENT DOCUMENTS

| | | | | |
|---|---|---|---|---|
| 3,344,604 | A * | 10/1967 | Mattia | ........................ F02K 1/70 239/265.27 |
| 4,731,991 | A * | 3/1988 | Newton | ..................... F02K 1/72 239/265.31 |

FOREIGN PATENT DOCUMENTS

| | | |
|---|---|---|
| FR | 2 588 312 A1 | 4/1987 |
| FR | 2 947 869 A1 | 1/2011 |

OTHER PUBLICATIONS

International Search Report dated Jan. 19, 2016 in PCT/FR2015/052732 filed Oct. 12, 2015.

(Continued)

*Primary Examiner* — Andrew H Nguyen
(74) *Attorney, Agent, or Firm* — Oblon, McClelland, Maier & Neustadt, L.L.P.

(57) ABSTRACT

A deployable grille with fins for a thrust-reversal system for an aircraft turbine engine. The grille can adopt a rest position and a deployed, active position wherein the fins are axially spaced further apart than in the rest position. At least between two fins, the grille includes resilient return device forcing the two fins to move apart axially from one another.

10 Claims, 7 Drawing Sheets

(56) References Cited

OTHER PUBLICATIONS

French Search Report dated Jun. 4, 2015 in FR 1459801 filed Oct. 13, 2014.
U.S. Appl. No. 14/479,820, filed Sep. 8, 2014, US 2015/0075132 A1, Thierry Kohn et al.

* cited by examiner

DEPLOYABLE GRILLE WITH FINS FOR AIRCRAFT TURBINE ENGINE THRUST-REVERSAL SYSTEM

TECHNICAL FIELD

The present invention relates to the field of aircraft turbine engine thrust-reversal systems, and more particularly to the field of grilles with fins equipping such systems.

The invention applies to any type of turbine engine for an aircraft, preferably to turbojet engines.

PRIOR ART

In the prior art, the use of grilles with fins for forming thrust-reversal systems is known. In these systems, the fins take the form of deflectors for redirecting forwards part of the air flow coming from the secondary duct of the turbojet engine. Reversing the direction of this air flow contributes to the braking of the aircraft during landing.

Grilles with a deployable character are in particular known from the document FR 2 947 869. With this type of design, in the rest position of the grille, the fins are stacked and occupy a small space. The length of the reverser is thus reduced, which results in a gain in terms of mass and aerodynamic performances.

The document FR 2 588 312 also proposes a reverser grille with a deployable character. One of the particularities lies in the ability to move, downstream, the movable nacelle cowl element, after the grille has reached its deployed active position. By virtue of this movement, the grille can be entirely uncovered during the thrust-reversal phases. Nevertheless, in this thrust-reversal system, the fins are deployed solely under the effect of the aerodynamic force applied to these same fins. Consequently this technical solution is liable to suffer from a problem of reliability since there exists a risk that the air coming from the secondary duct does not manage to bring about such a deployment of the grille. To attenuate this risk, it is possible to adapt the form of the fins and/or to arrange them in a particular way in order to assist the deployment of the grille, under the effect of the aerodynamic force applied by the secondary air. However, these adjustments may impair the thrust-reversal performance.

OBJECT OF THE INVENTION

The aim of the invention is thus to at least partially remedy the drawbacks relating to the embodiments of the prior art.

To do this, the subject matter of the invention is first of all a deployable grille with fins for an aircraft turbine engine thrust-reversal system, the grille being capable of adopting a rest position and a deployed active position in which the fins are further separated axially from one another than in the rest position. According to the invention, the grille comprises, at least between two fins, resilient return means forcing said two fins to separate axially from each other.

Thus the invention advantageously makes it possible to improve the reliability of deployment of the grille by virtue of the presence of the resilient return means forcing the fins to separate from one another.

The invention has at least one of the following optional features, taken in isolation or in combination.

The grille comprises a plurality of axial elements for supporting and guiding the fins, each of the axial support and guidance elements passing through an axial row of orifices formed respectively through the fins of the grille, the orifices in the same row having the same cross-section of passage. In addition, each axial support and guidance element, at least in a main part thereof passing through the associated row of orifices and being defined between the furthest upstream fin and the furthest downstream fin of the grille in the deployed active position, has an external surface with a constant cross-section.

This preferred solution enables the fins to deploy by sliding on the axial support and guidance elements, for example rods, the external surface of which remains uniform at least in the predefined main part. It therefore contrasts with the solution of the document FR 2 588 312, requiring telescopic support and guidance elements, as can be seen in FIG. 6 of this document. There are effectively provided therein deployable support and guidance elements the cross-section of which increases at each fin going downstream, which contrasts with the constant cross-section of the elements provided in the preferential solution of the invention. The result is a gain in terms of space requirement, mass and aerodynamic performances of the grille.

Preferably, the resilient return means are arranged around one or more of the axial elements supporting and guiding the fins.

Preferably, the resilient return means are arranged between each fin of the grille and a fin directly following in this grille. In addition, said resilient return means are configured so that, in the deployed active position of the grille, the forces exerted by said resilient means, on the fins, cause the latter to be evenly spaced apart axially from one another.

Preferably, the resilient return means are produced by means of compression springs with spirals, and/or by means of one or more resilient washers.

Another subject matter of the invention is a thrust-reversal system for an aircraft turbine engine, comprising a fixed element, a movable nacelle cowl element and at least one deployable grille as described above.

Preferably, the thrust-reversal system comprises at least one first actuator and stop means retaining a downstream end of said grille axially towards the downstream direction, the system being designed so that the grille is deployed from its rest position to its deployed active position by means of the return force developed by the resilient return means, following an axial downstream movement of the stop means, generated by a deployment of said first actuator. In addition, said stop means preferentially form an integral part of said first actuator. Alternatively, these stop means could be independent of the first actuator, for example provided so as to be secured to the movable nacelle cowl element.

Preferably, the system also comprises at least one second actuator connecting said fixed element of the system to the movable nacelle cowl element, so as to allow an axial movement of the latter in relation to the grid in its deployed active position.

Preferably, the first and second actuators comprise respectively a first actuator rod and a second actuator rod arranged concentrically.

Finally, a subject matter of the invention is an aircraft turbine engine, preferably a bypass turbojet engine, comprising a thrust-reversal system as described above.

Other advantages and features of the invention will emerge in the following non-limitative detailed description.

BRIEF DESCRIPTION OF THE DRAWINGS

The invention will be able to be understood better from a reading of the following detailed description of non-limitative example embodiments thereof, and from an examination of the accompanying drawings, among which.

DETAILED DISCLOSURE OF PARTICULAR EMBODIMENTS

Figure 1:
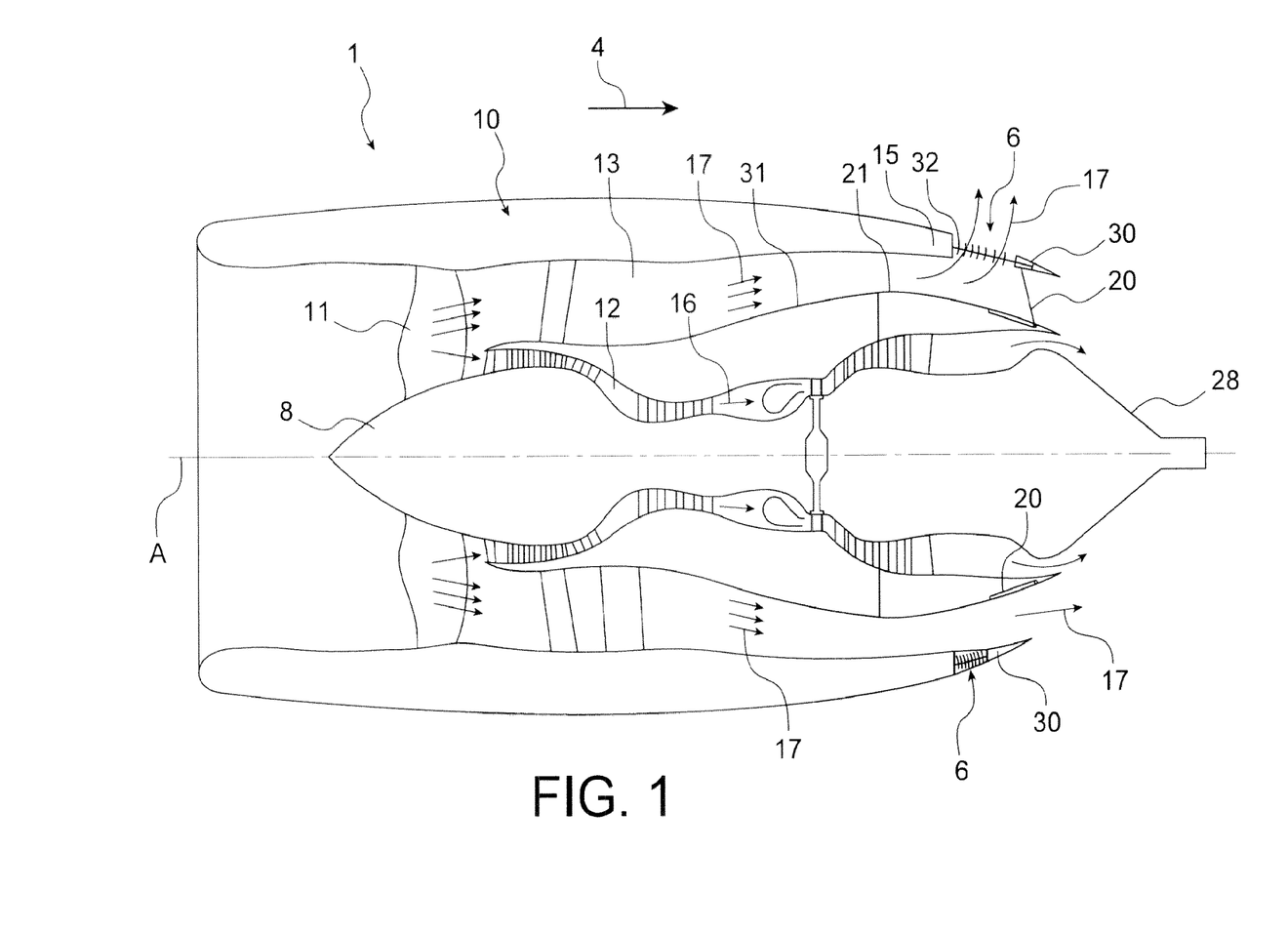
FIG. 1 shows a schematic view in longitudinal section of a turbojet engine according to the invention.

With reference to FIG. 1, a turbojet engine 1 is shown according to a preferred embodiment of the invention. This is a bypass turbojet engine with longitudinal axis A, comprising a central engine 8, a primary flow 16 passing through a primary duct 12, a secondary flow 17 that passes through a fan 11 before passing through a secondary duct 13, and a nacelle 10. The primary and secondary flows are separated by a primary-pipe fairing 31. The external wall of this fairing is the internal wall 21 of the secondary duct 13.

The nacelle 10 comprises, downstream of the fan 11, in relation to a main direction 4 of flow of the gases in the turbojet engine, a thrust-reversal system 6 specific to the present invention, and which will be described in detail with reference to the following figures.

In a known manner, when the thrust-reversal system is in an inactive rest position and the turbojet engine is fulfilling its normal propulsion function, the two flows 16, 17 are ejected around a central exhaust cone 28 of the turbojet engine, through their respective ducts 12, 13. This configuration is shown schematically on the half-section from below in FIG. 1.

On the other hand, when the thrust-reversal function is required, a movable nacelle-cowl element 30 is moved downstream, so as to be moved away from a fixed nacelle element 15. The downstream movement of the movable element 30 reveals deployed thrust-reversal grilles 32, as shown schematically on the half-section from above in FIG. 1. During this thrust-reversal phase, movable flaps 20 are actuated so as to partially close off the secondary duct 13 at the downstream end thereof, so that the secondary flow 17 is forced to escape through the grilles 32. In passing through the grilles, the secondary flow is diverted so as to be reoriented upstream, thus creating a braking force for the aircraft.

Figure 2:
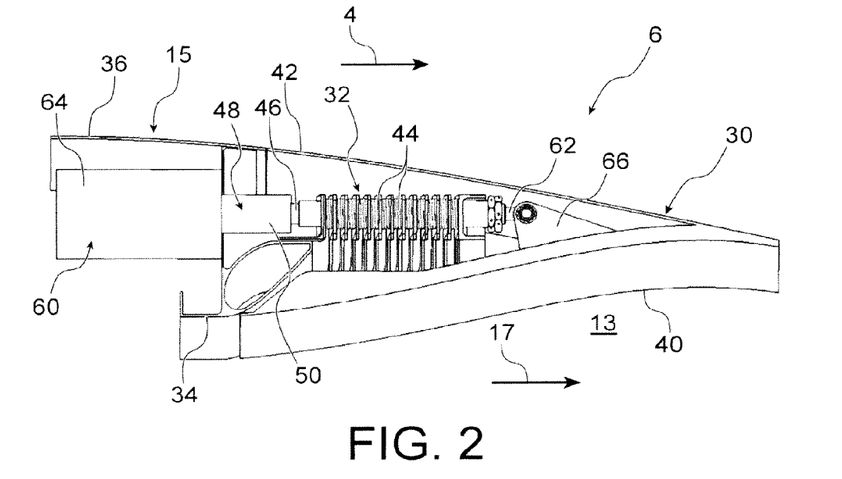
FIG. 2 shows a more detailed view, in longitudinal half-section, of the thrust-reversal system equipping the turbojet engine in the previous figure.
Figure 3:
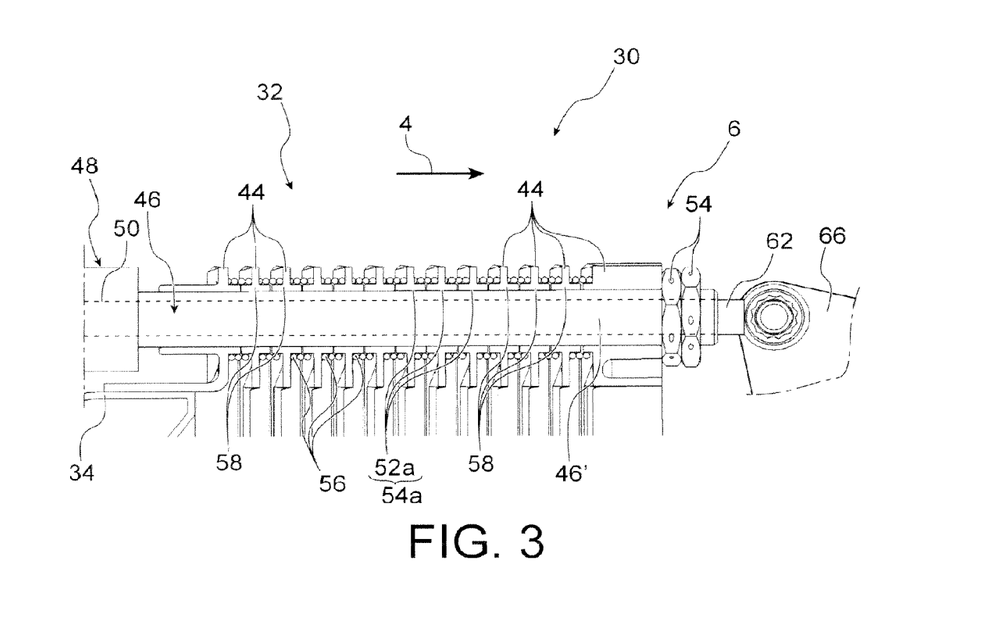
FIG. 3 shows a more detailed view, in longitudinal half-section, of a deployable grille forming an integral part of the thrust-reversal system shown in the previous figure.

With reference now to FIGS. 2 and 3, the thrust-reversal system 6 shown in an inactive rest state, as adopted when the turbojet engine is fulfilling its normal propulsion function in flight, will be detailed. Overall, the system 6 comprises the fixed element 15, the movable nacelle-cowl element 30 and one or more deployable thrust-reversal grilles 32.

More precisely, the fixed element 15 constitutes the upstream part of the reversal system 6. It comprises essentially a structural frame 34 centred on the axis of the turbojet engine, and an aerodynamic fairing element 36 forming an integral part of the nacelle, this element 36 being supported by the frame 34.

The movable element 30 for its part has a hollow-shaped longitudinal half-section, open axially towards the upstream end, for example in the overall form of a horizontal V. The internal space defined by the V is dedicated to the arrangement of the deployable grilles 32, when they are in a rest position as shown in FIGS. 2 and 3. The internal surface 40 of the movable element 30 forms the external radial delimitation of the secondary duct 13, while its external surface 42 is situated aerodynamically in line with the aerodynamic fairing 36, situated further upstream.

The movable element 30 extends over 360° around the axis of the turbojet engine. The grilles 32 also extend over 360°, being for example arranged end to end in the circumferential direction. Alternatively, it could be a case of a single grille extending in a single piece over 360°. For reasons of clarity of the description, it will be considered hereinafter that the thrust-reversal system 6 has only one grille extending over 360°, it being understood however that the technical features of the invention apply in a similar manner to the other case, in which a plurality of grilles are provided and arranged end to end.

The grille 32 therefore has a deployable character in the axial direction. It is also referred to as a stretchable grille or extensible grille. It is in fact designed to be able to be deployed axially so as to pass from a rest position as shown in FIGS. 2 and 3 to a deployed activated position that will be described below.

The grille 32 comprises a plurality of fins 44 arranged successively behind one another in the axial direction, each of them being arranged in a transverse plane of the turbojet engine. Each of these fins 44 fulfils an air deflector function, in a manner known to persons skilled in the art. In addition, the holding of the fins 44 with respect to one another is provided by a plurality of radial support and guidance elements, only one of them being visible in FIGS. 2 and 3. This is here a first rod 46 of a first actuator 48, the cylinder 50 of which is secured to the frame 34.

The rod 46, secured to the piston of the actuator 48, passes through an axial row 54a of orifices 52a formed through the fins 44. These orifices 52a all have the same cross-section of passage, that is to say they all here have the same diameter. This diameter is substantially equal to that of the main part 46' of the rod 46, the main part being defined as the one passing through the row 54a of orifices 52a, being situated between the fin 44 furthest upstream in the grille and the fin furthest downstream. Nevertheless, the diameter of the rod 46 is here preferentially uniform throughout it, even beyond its main part 46', as far as its fixing on the piston (not visible in FIGS. 2 and 3).

The fin 44 furthest upstream, the one furthest to the left in FIG. 3, is secured to the frame 34 and mounted so as to slide on the rod 46. The other fins 44 are also mounted so as to slide on the rod 46, but not secured to the frame 34 and therefore capable of moving along the first rod 46.

At its downstream end, the rod 46 carries one or more nuts 54 forming a stop axially holding, in the downstream direction, the furthest downstream fin 44 of the grille 32. The nuts 54 are thus considered to form here an integral part of the first actuator 48, since they are mounted fixedly on the actuator rod 46.

One of the particularities of the invention lies in the placing of the springs 54 between the fins 44 so as to force them to separate axially from one another. The springs 56, of the spiral compression spring type, are arranged around the rod 46. More precisely, they are arranged around axial jackets 58 provided on the fins, these jackets defining the orifices 52a and being themselves arranged around the rod 46. The inside diameter of the springs thus corresponds substantially to the outside diameter of the jackets 58.

Preferably, on the rod 46, a single spring 56 is provided between two fins 44 directly consecutive axially, the two ends of the spring then being respectively in abutment against the two facing flanks of the fins concerned. More precisely, a spring 56 is provided between the furthest upstream fin and the second fin of the grille, another spring 56 is arranged between the second and third fins, and so on as far as the most downstream fin of the grille 32.

In the state shown in FIG. 3, the actuator rod 46 is in the retracted position. The fins 44 are kept close to one another, being gripped between the furthest upstream fixed fin 44 and the nuts 54. In this state, the actuator 48 in the retracted state opposes the return forces developed by the springs 56, which are compressed. In this state where the grille 32 occupies an axially non-deployed rest position, the fins 44 are in contact with one another, via their axial jackets 58. As will be detailed below, the emergence of the first actuator rod 46 results in axially separating the nuts 54 from the furthest upstream fixed fin 44, and therefore enabling the other fins 44 of the grille to separate from one another, under the effect of the return force of the springs 56 that are expanding. This constitutes a reliable and clever solution, ensuring the deployment of the thrust-reversal grille 32. It should be noted that this deployment is also assisted by the aerodynamic forces applied to the fins of the grid during stretching, with the secondary air flow passing through.

The thrust-reversal system 6 is also equipped with a second actuator 60, having a second actuator rod 62 as well as a cylinder 64 secured to the frame 34, and placed at the rear of the cylinder 50 of the first actuator 48. The actuator rod 62 is mounted concentrically inside the first actuator rod 46 and able to move therein. This second rod 62 extends in a downstream direction beyond the first rod 46, and extends in the upstream direction while passing concentrically through the cylinder 50 of the first actuator 48, as shown schematically in FIG. 3. The downstream end of the second actuator rod 62 is mounted on a bracket 66 of the movable element 30 so as to connect this element 30 to the fixed element 15 of the system 6, and so as to control the axial separation between these two elements 15, 30. As indicated previously, in the inactive rest state of the thrust-reversal system 6, this axial separation is zero since the two elements 15, 30 are arranged in line with each other.

Figure 4:
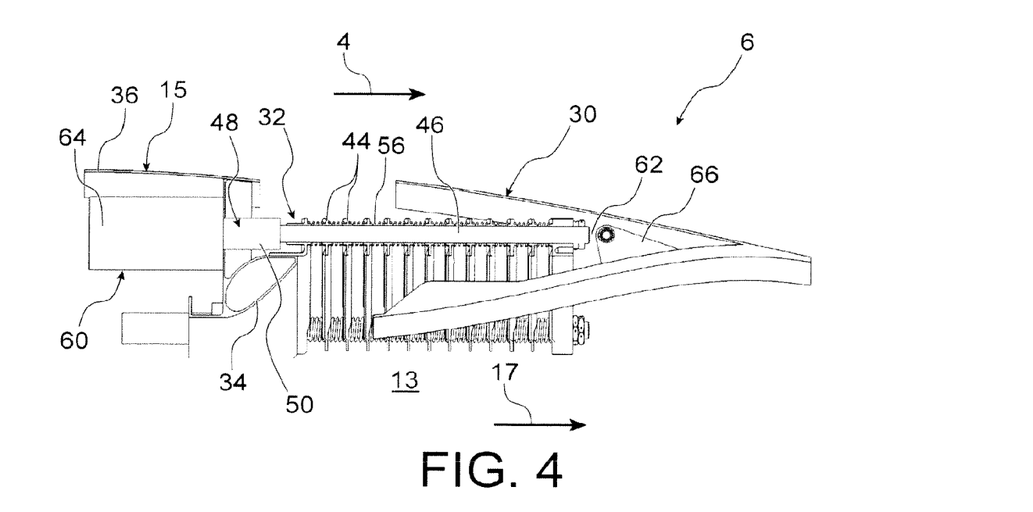
FIG. 4 and FIG. 5 show views in longitudinal half-section of the thrust-reversal system in FIG. 2, in various positions during deployment thereof.
Figure 5:
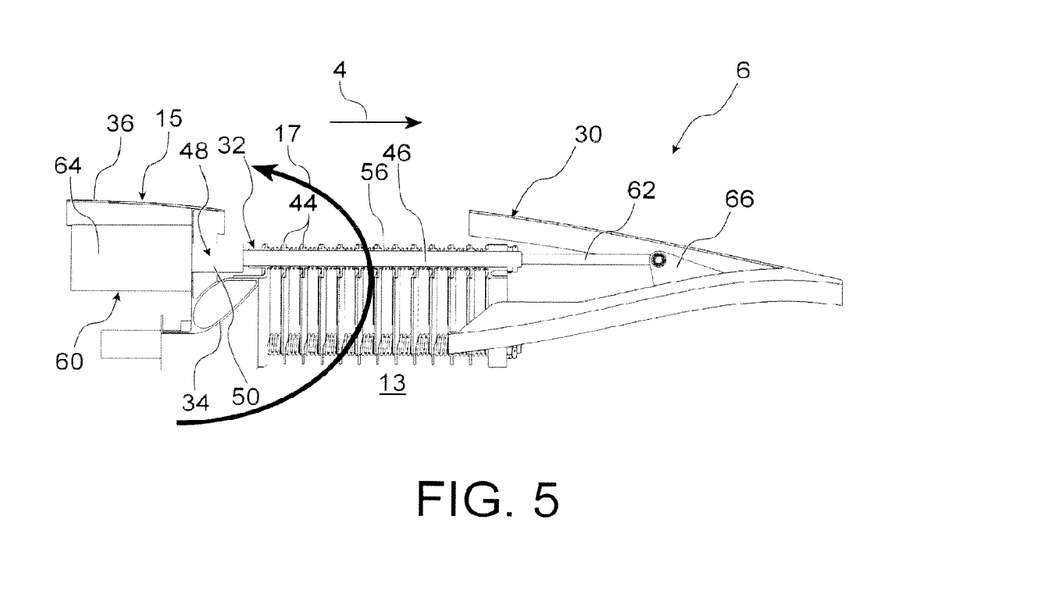
Figure 6:
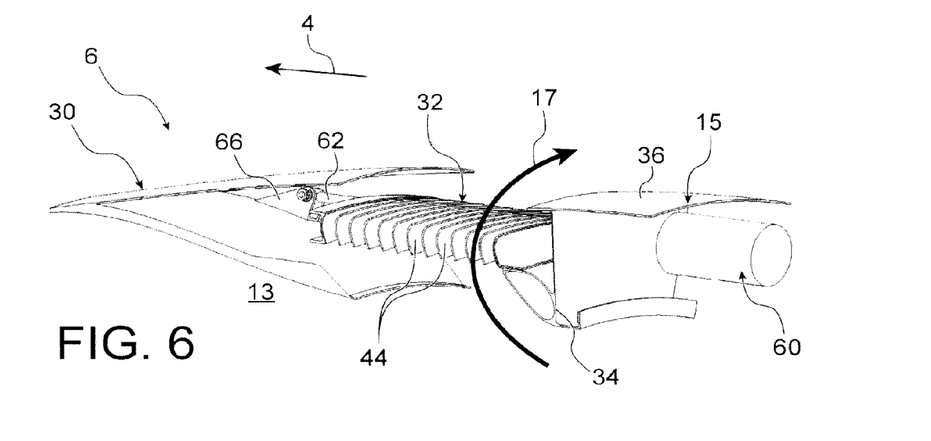
FIG. 6 is a partial view in perspective of the thrust-reversal system in the same operating state as the one in FIG. 5.

With reference now to FIGS. 4 and 5, the thrust-reversal system 6 is shown in various positions during deployment thereof, that is to say when passing from the inactive rest position described previously to an active position for fulfilling the thrust-reversal function.

First of all, the two actuator rods 46, 62 are brought out simultaneously by controlling the actuators 48, 60. The emergence of the second rod 62 causes the downstream retraction of the movable element 30 in relation to the fixed part 15 of the system. At the same time, the emergence of the first actuator rod 46 results in axially moving the stop nuts 54 in the downstream direction. This enables the fins 44 of the grille 32 to separate axially from one another under the effect of the return force of the springs 56. In other words, as the actuator rod 46 emerges from its cylinder 50, the grille gradually deploys under the effect of the springs 56, which expand and push the fins 44 so as to be distributed evenly between the furthest upstream fixed fin and the moving nuts 54.

FIG. 4 shows the grille 32 in its deployed active position, in which the actuator rod 46 is brought out to the maximum in comparison with the operating conditions of the first actuator 48. Because of the identical nature of the springs 56 between the fins 44, these are in fact axially spaced evenly from one another, or almost evenly. This is because, even if a slight aerodynamic distortion is present in the secondary air flow passing through the grille, the differential in aerodynamic loads caused by this distortion on the succession of fins is generally negligible compared with the return force of the springs. The variations in spacing between the fins, in the deployed active position of the grille, are therefore very small.

More generally, it should be noted that the choice of the stiffness and number of springs makes it possible to control the separations between the fins, these separations being able to be intentionally irregular, while being fixed at different values according to the position of the fins on the grille.

When the grille 32 reaches its deployed active position in FIGS. 4 and 5, the emergence of the rod 46 is stopped, while the emergence of the other rod 62 is continued so as to continue the downstream movement of the movable element 30, relative to the grille 32. This makes it possible to uncover the grille 32 entirely, and thus to reach the operational position of the thrust-reversal system 6, as shown in FIG. 5. In this position, the secondary flow 17 flowing in the duct 13 is forced to pass through the grille 32 so as to reverse the direction of the flow and to cause the required braking. After its deflection by the grille 32, the flow 17 escapes in the upstream direction in the opposite direction to the direction 4, using the space released axially between the two elements 15, 30 of the thrust-reversal system 6.

The grille 32 is preferentially equipped with a plurality of axial elements for supporting and guiding the fins 44, spaced apart circumferentially from one another. First of all, as shown schematically in FIG. 7, a plurality of assemblies 70 can be provided, each including a first actuator 48 and a second actuator 60. The actuator rod 46 of each of these assemblies 70 then fulfils the function of axial element for supporting and guiding the fins 44. By way of indicative example, the assemblies 70 may be spaced apart circumferentially from one another by an angle of between 10° and 40°. All or some of them only may be equipped with springs 54 aimed at deploying the grille 32. These assemblies 70 are of course controlled simultaneously by conventional means, not described.

Figure 7:
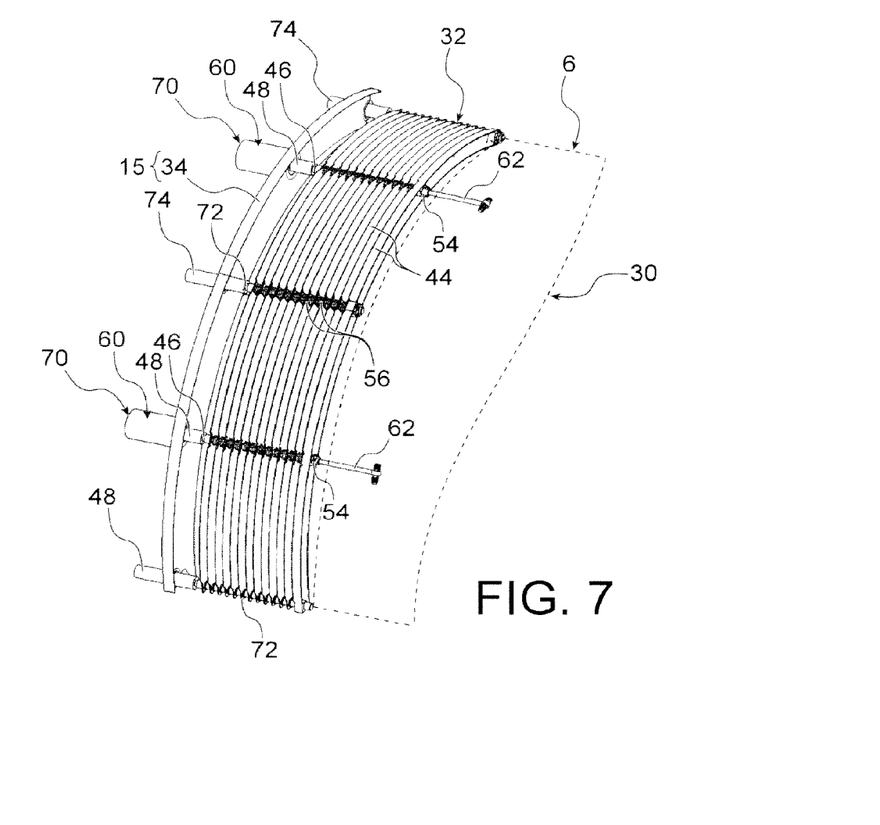
FIG. 7 is a wider view in perspective of the thrust-reversal system, still in the same operating state as the one in FIG. 5.

In order to reinforce the holding and axial guidance of the fins 44, other means may be employed, such as follower rods 72. These rods 72 are similar to the actuator rods 46, in particular in that they are each arranged so as to slide through a cylinder 74 fixed to the frame 34. The difference from the actuator rods 46 is that they merely follow the movement applied by these rods 46, that is to say they are not controlled. They also pass through axial rows of orifices formed through the fins, while preferably also being surrounded by springs 54, aimed at the deployment of the grille.

Figure 8:
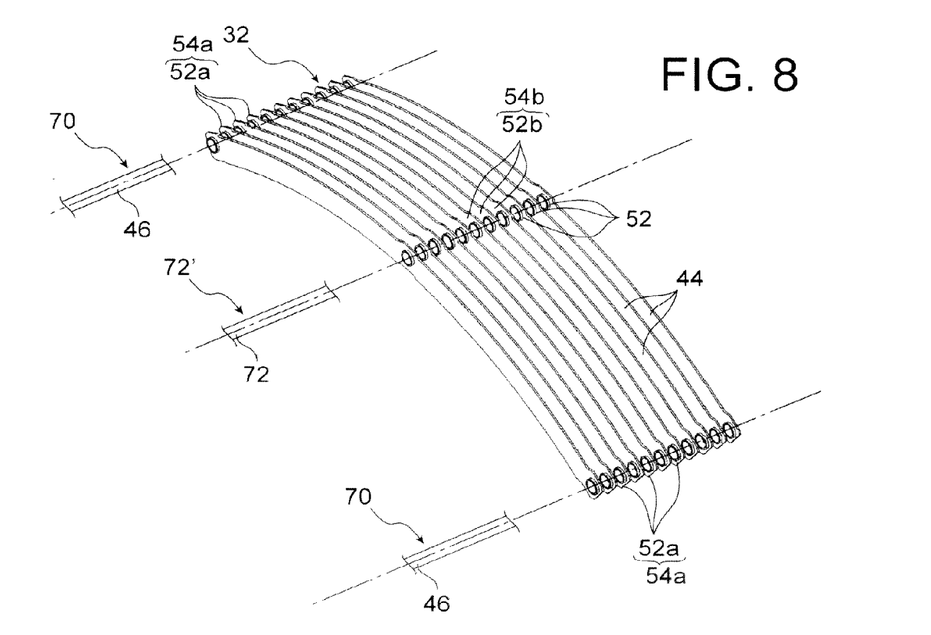
FIG. 8 shows a partial and exploded view in perspective of the thrust-reversal system shown in the previous figures.

In this regard, with reference to FIG. 8, it should be noted that each follower rod 72 passes through an axial row 54b of orifices 52b formed through the fins 44. These orifices 52b all have the same cross-section of passage, that is to say they all have the same diameter, preferably identical to the diameter of the orifices 52a associated with the piston rods 46. This diameter is therefore substantially identical to that of the main part 72' of the follower rod 72, the main part being able to be defined identically is the one adopted for the actuator rods 46.

The means for supporting and guiding the fins 44 are consequently formed by parallel axial rods 46, 72 on which these fins can slide, and at least the main part 46', 72' of which has an external surface of constant cross-section, optionally different depending on the rod. Consequently, axial support and guidance elements of a telescopic nature are preferentially excluded, since they cause problems of space requirement, mass and drag at the grille.

Figure 9:
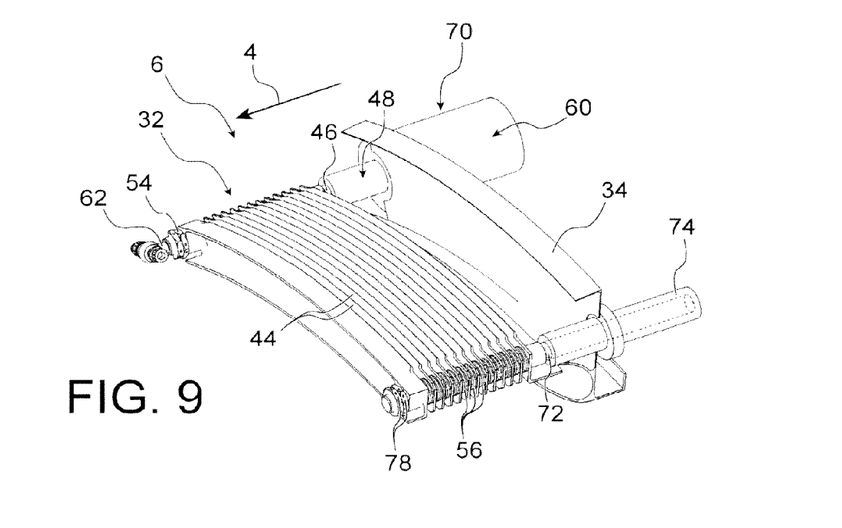
FIGS. 9 to 11 show partial views in perspective of a part of the thrust-reversal system in various positions during deployment thereof.
Figure 10:
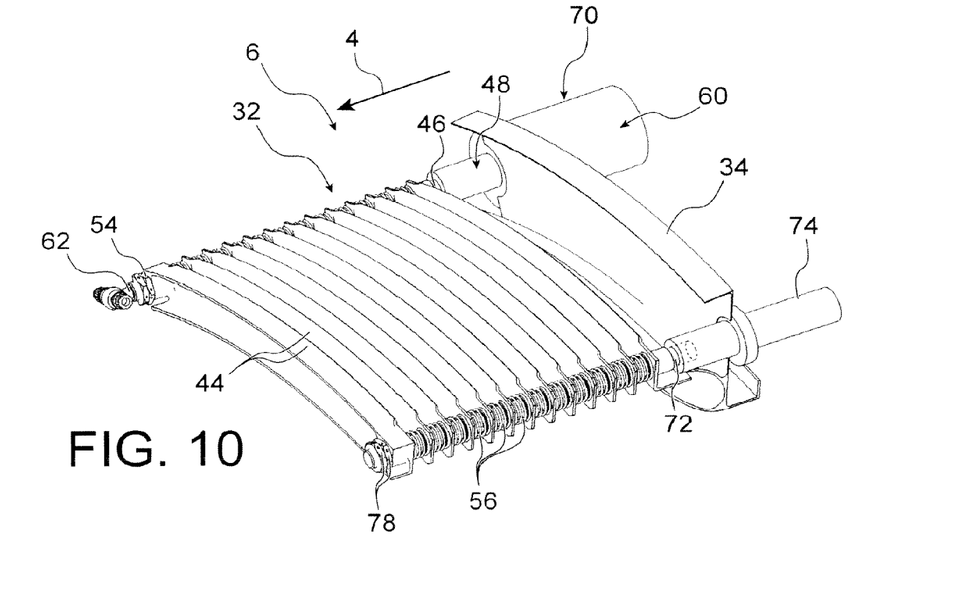
Figure 11:
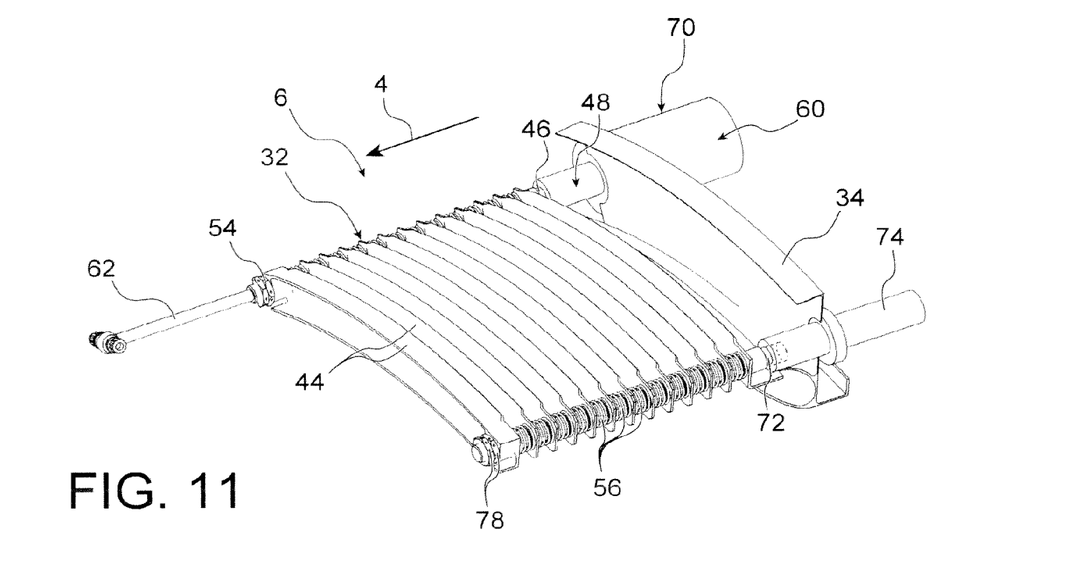

FIGS. 9 to 11 show a part of the grille 32, in various states during the activation of the thrust-reversal system 6. This part of the grille, which has been shown in these figures, incorporates an assembly 70, as well as a follower rod 72. The functioning and behaviour of the other assemblies 70 and rods 72 are the same as those that will be described below, for the elements depicted.

The grille 32 is deployed by the emergence of the actuator rod 46 of the assembly 70, as described previously. During this emergence, the fin 44 furthest downstream bears axially in the downstream direction on stop nuts 78, screwed to the end of the follower rod 72. This causes the downstream movement of the follower rod 72, a movement that takes place simultaneously with that of the rod 46. The instant at which the rod 46 is fully emerged corresponding also to the instant when the follower rod 72 arrives in abutment on the cylinder 74, at an upstream end with the greatest diameter. Because of this, in the deployed position in FIG. 10, the grille 32 is held axially towards the downstream direction not only by the nuts 54 of the actuator rods 46 but also by the nuts 78 of the follower rods 72, in abutment in their cylinders.

After the obtaining of the deployed active position of the grille 32, the emergence of the actuator rod 62 is continued as described previously and shown schematically once again in FIG. 11.

Figure 12:
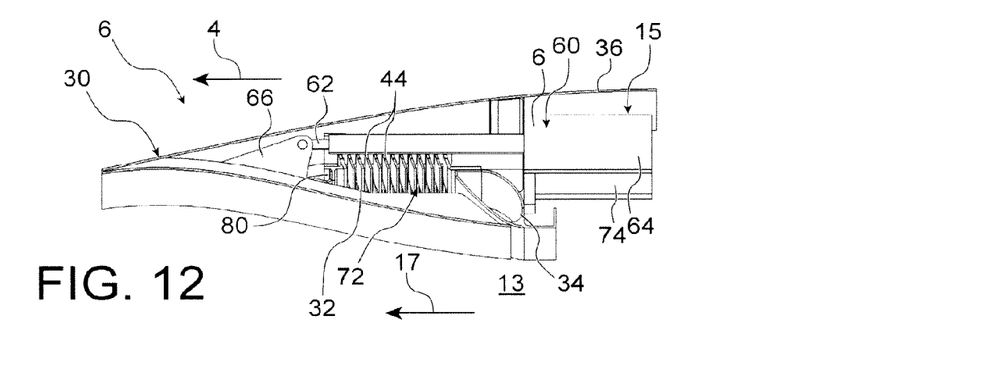
FIGS. 12 to 14 show views in half section of a thrust-reversal system in various positions during deployment thereof, the system being in the form of another preferred embodiment of the invention.
Figure 13:
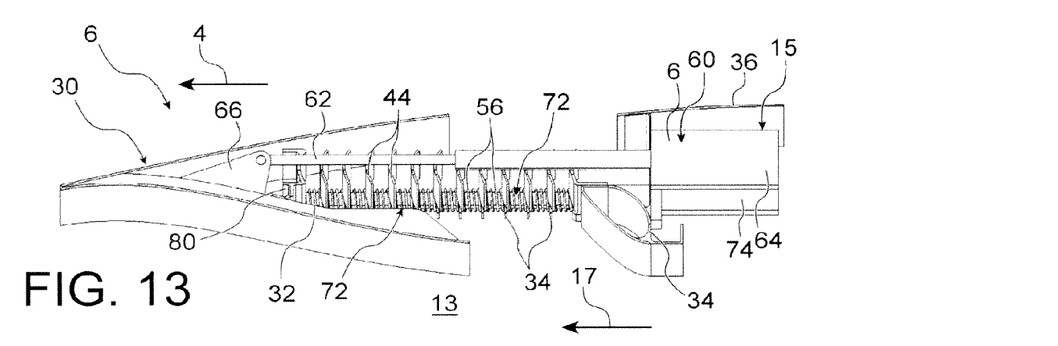
Figure 14:
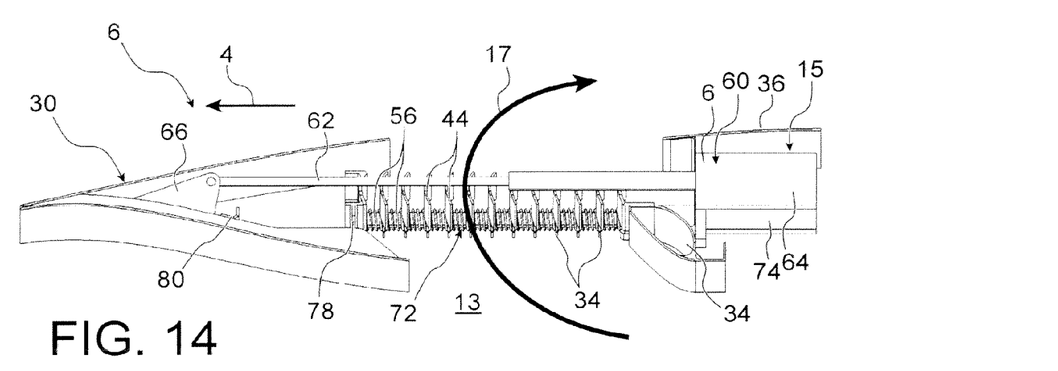

With reference now to FIGS. 12 to 14, another preferred embodiment is shown in which the principle of follower rods 72 is kept. The change compared with the preferred embodiment described previously lies in the simplification of the assemblies 70, which are only equipped with the actuator 60, but no longer equipped with the actuator 48. In this embodiment, the actuator rod 62 therefore always connects the movable element 30 to the frame 34, via the actuator cylinder 64 fixed to this frame of the fixed element 15. The actuator rod 62 then passes with clearance through orifices (not shown) formed through the fins 44 of the grilles, without fulfilling any function of support and axial guidance of the fins. This function is here provided only by the follower rods 72, which are also the only ones to support the springs 56 for deployment of the grille 32.

In the inactive rest state of the thrust-reversal system 6 shown in FIG. 12, the fin 44 furthest downstream of the compacted grille 32 is held by stop means 80, secured to the movable element 3. It may for example be a case of one or more brackets mounted fixedly on the movable cowl 30, preferably inside the V.

The emergence of the actuator rod 62 results in axially separating these stop means 80 from the fixed fin 44 furthest upstream. This enables the other fins 44 of the grille to separate from one another under the effect of the return force of the springs 56 surrounding the follower rods 72, and still forcing the furthest downstream fin against the stop means 80. Thus, in this embodiment, the phase of deployment of the grille 32 is controlled by the actuator 60, which therefore fulfils the role of the first actuator 48 used in the previous embodiment.

Once the grille 32 is fully deployed as shown in FIG. 13, the emergence of the actuator rod 62 is continued in order to translate the movable element 30 downstream, and fully uncover the grille 32, as shown in FIG. 14. During this final phase as well as during the entire thrust-reversal phase, the holding of the grille in the downstream direction is no longer provided by the stop means 80, which are then at a distance, but provided only by the nuts 78 of the follower rods 72, in abutment in their respective cylinders 74.

Whatever the embodiment, it should be noted that the opposite action, aimed at making the reversal system 6 inactive, takes place by performing the same steps as those described above but in a chronologically reverse order.

Naturally various modifications can be made by a person skilled in the art to the invention that has just been described solely by way of non-limitative examples.

The invention claimed is:

1. A deployable grille with fins for an aircraft turbine engine thrust-reversal system, wherein the grille is configured to adopt a rest position and a deployed active position in which the fins are more separated axially from one another than in the rest position, and wherein said grille comprises, at least between two of the fins, a resilient return configured to force said two of the fins to separate axially from each other.

2. The grille according to claim 1, wherein a plurality of axial elements support and guide the fins, each of the axial support and guidance elements passing through an axial row of orifices formed respectively through the fins of the grille, the orifices in the same row having the same cross-section of passage, and wherein each axial support and guidance element, at least in a main part thereof passing through the associated row of orifices and being defined between the furthest upstream fin and the furthest downstream fin of the grille in the deployed active position, has an external surface with a constant cross-section.

3. The grille according to claim 2, wherein the resilient return is arranged around one or more of the axial elements for supporting and guiding the fins.

4. The grille according to claim 1, wherein the resilient return is arranged between each fin of the grille, and wherein said resilient return is configured so that, in the deployed active position of the grille, the forces exerted by said resilient return on the fins cause the fins to be evenly spaced apart axially from one another.

5. The grille according to claim 1, wherein the resilient return comprises compression springs with spirals, and/or one or more resilient washers.

6. The thrust-reversal system for an aircraft turbine engine, the system comprising a fixed element, a movable nacelle cowl element and at least one deployable grille according to claim 1.

7. A thrust-reversal system according to claim 6, comprising at least one actuator and a stop axially holding towards the downstream direction a downstream end of said at least one grille, and wherein the system is designed so that the at least one grille is deployed from its rest position to its deployed active position by means of a return force developed by said resilient return, following an axial movement of the stop towards the downstream direction, generated by a deployment of a first actuator of said at least one actuator, said stop forming an integral part of said first actuator.

8. A thrust-reversal system according to claim 7, comprising at least one second actuator of said at least one actuator connecting said fixed element of the system to the movable nacelle cowl element, so as to allow an axial movement of the movable nacelle cowl element relative to the at least one grille in its deployed active position.

9. A thrust-reversal system according to claim 8, wherein the first actuator and the at least one second actuators comprise respectively a first actuator rod and a second actuator rod arranged concentrically.

10. An aircraft turbine engine comprising a thrust-reversal system according to claim 6.

\* \* \* \* \*

UNITED STATES PATENT AND TRADEMARK OFFICE
CERTIFICATE OF CORRECTION

PATENT NO. : 10,378,481 B2
APPLICATION NO. : 15/516938
DATED : August 13, 2019
INVENTOR(S) : Jeremy Edmond Fert It is certified that error appears in the above-identified patent and that said Letters Patent is hereby corrected as shown below:

In the Claims

Column 9, Line 8, change "one second actuators" to --one second actuator--.

Signed and Sealed this
Twenty-fifth Day of February, 2020

Andrei Iancu
*Director of the United States Patent and Trademark Office*